United States Patent
Tokunou et al.

[11] Patent Number: 5,924,188
[45] Date of Patent: Jul. 20, 1999

[54] METHOD OF MANUFACTURING BOTTOMED HOLLOW CYLINDER USING A PRESS

[75] Inventors: Yasunori Tokunou, Ehime-ken; Kouichi Inoue, Oozu; Toshikazu Shogase, Oozu; Makoto Sunouchi, Oozu; Takeshi Yoshikawa, Oozu, all of Japan

[73] Assignee: Matsushita Electric Industrial Co., Ltd., Osaka, Japan

[21] Appl. No.: 08/811,437

[22] Filed: Mar. 3, 1997

[30] Foreign Application Priority Data

Mar. 4, 1996 [JP] Japan ..................................... 8-045744
Aug. 22, 1996 [JP] Japan ..................................... 8-220906

[51] Int. Cl.$^6$ .................................................. G11B 5/127
[52] U.S. Cl. .......................................... 29/603.12; 72/348
[58] Field of Search ....................... 29/557, 558, 603.12; 72/348; 360/130.24, 130.22

[56] References Cited

U.S. PATENT DOCUMENTS 5,379,626 1/1995 Hara et al. .
5,394,727 3/1995 Diekhoff et al. .......................... 72/348

FOREIGN PATENT DOCUMENTS 63-211113 9/1988 Japan .
2286783 8/1995 United Kingdom .

*Primary Examiner*—Timothy V. Eley
*Assistant Examiner*—Benjamin M. Halpern
*Attorney, Agent, or Firm*—McDermott, Will & Emery

[57] ABSTRACT

A manufacturing method is provided for forming a hollow cylinder with a bottom which may be employed in rotary head drums of magnetic recording and reproduction systems such as video tape recorders and digital audio tape recorders.

The manufacturing method includes pressing a single circular plate to form the hollow cylinder, thrusting an end of a side wall of the hollow cylinder in a direction substantially parallel to the side wall in a press die so as to adjust the thickness of the side wall to be uniform, and machining an outer surface of the side wall of the hollow cylinder so as to have a given surface roughness and a given roundness.

13 Claims, 13 Drawing Sheets

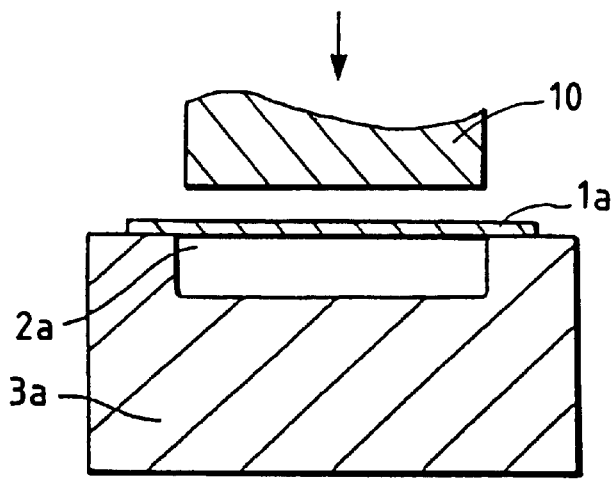 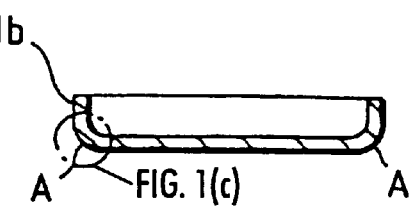
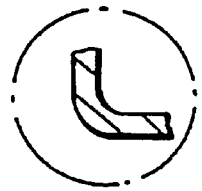
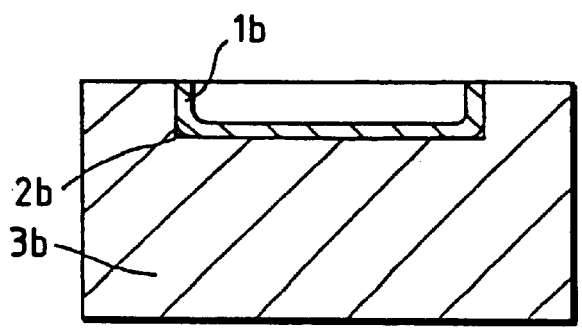 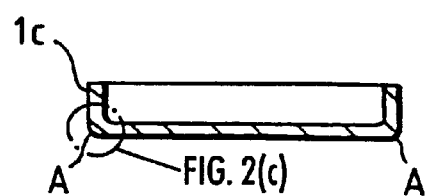
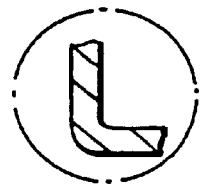

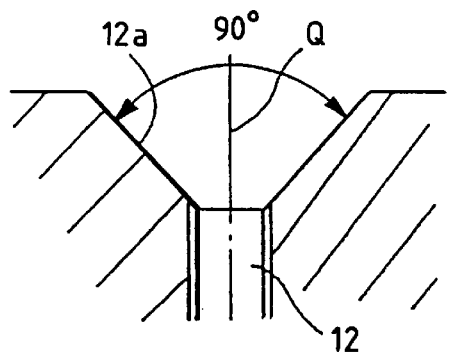
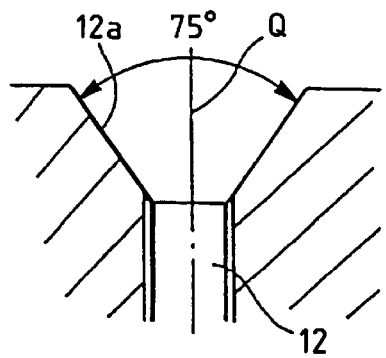
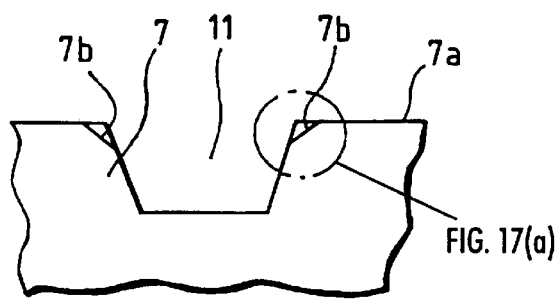
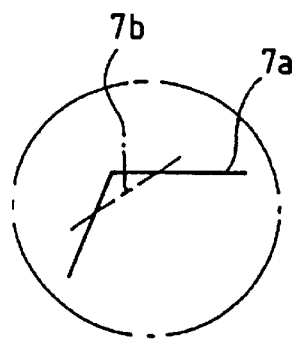
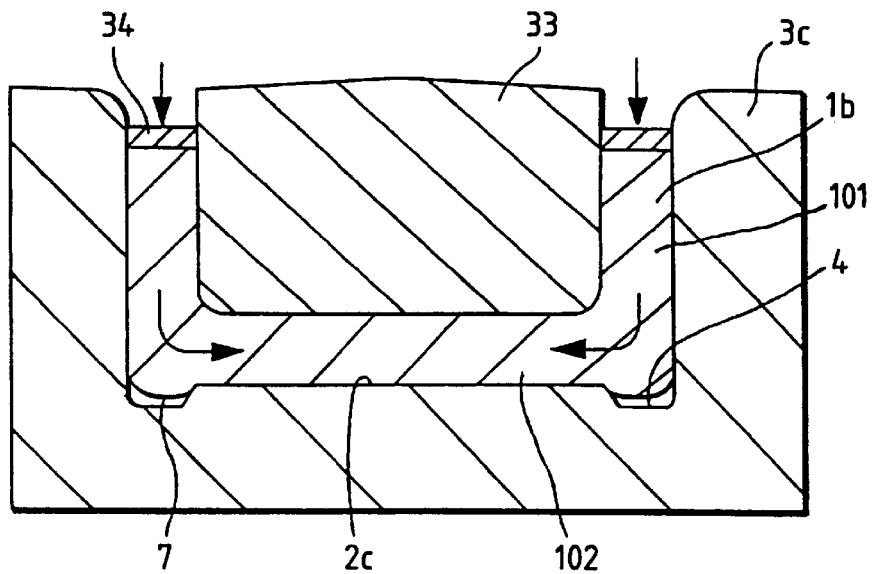

METHOD OF MANUFACTURING BOTTOMED HOLLOW CYLINDER USING A PRESS

BACKGROUND OF THE INVENTION

1. Technical Field

The present invention relates generally to a method of manufacturing a hollow cylinder with a bottom, and more particularly to a method of pressing a circular plate to form a hollow cylinder with a bottom which may be employed in rotary head drums of magnetic recording and reproduction systems such as video tape recorders and digital audio tape recorders.

2. Background of Related Art

As is well known in the art, a rotary head type magnetic recording and production system wraps a traveling magnetic tape helically about a rotary head drum to form slant tracks on the magnetic tape for recording information thereon or to reproduce information recorded in slant tracks on the magnetic tape. The rotary head drum usually consists of a bottomed lower cylinder and a rotary upper cylinder disposed coaxially with the lower cylinder.

Such upper and lower cylinders are commonly manufactured by die-casting an aluminum alloy and machining it into a desired shape.

Japanese Patent First Publication No. 63-211113 teaches an alternative manufacturing method of pressing a single disc plate to form a cylindrical member for rotary head drums.

Finishing a casting into a desired shape precisely, however, requires a large amount of machining or a large amount of time for shaping. Within an object die-casted, porosity or cavities may form and appear at a surface of the object after being cut into a final shape, resulting in a defective product. Even if the cavities do not appear at the surface of the object, they may result in rotational unbalance of, for example, a rotary head drum needed to be rotated with high accuracy. An unbalance-correcting operation thus becomes necessary.

The above problems involved in die-casting is not encountered in making a rotary head drum of a single metal plate in press working as taught in the above publication. This press working, however, simultaneously performs three steps of extending the periphery of a disc plate vertically, making the center thereof hollow, forming mounting holes for rotary heads and a rotational shaft, which may result in stress on the finished cylinder, leading to the fracture ultimately. The circularity of a side wall of the cylinder is usually low, causing the center of gravity of the rotary head drum to be shifted from the center of rotation, resulting in rotational shake of the rotary head drum. It is also difficult for the press working to provide a machining allowance to the side wall of the cylinder.

SUMMARY OF THE INVENTION

It is therefore a principal object of the present invention to avoid the disadvantages of the prior art.

It is another object of the present invention to provide a manufacturing method of pressing a single circular plate to form a cylinder with a bottom without breakage whose side wall has high circularity.

According to one aspect of the present invention, there is provided a method of manufacturing a hollow cylinder with a bottom comprising the steps of: (a) pressing a single circular plate using a first punch to form a hollow cylinder with a bottom; (b) thrusting an end of a side wall of the hollow cylinder in a direction substantially parallel to the side wall using a second punch so as to have given shape and given thickness of the side wall; and (c) machining an outer surface of the side wall of the hollow cylinder so as to have a given surface roughness and a given roundness.

In the preferred mode of the invention, the manufacturing method further includes the step of stretching pressing a central portion of the bottom of the hollow cylinder member to form a recess projecting inward of the hollow cylindrical member coaxially with the side wall of the hollow cylinder.

The manufacturing method also includes the step of pressing the bottom of the hollow cylinder to form an annular protrusion on the corner of the bottom and the step of machining a groove traversing a portion of the annular protrusion.

According to another aspect of the present invention, there is provided a method of manufacturing a bottomed hollow cylinder used as a rotary head drum comprising the steps of: (a) pressing a single circular plate using a first punch to form a hollow cylinder with a bottom; (b) thrusting an end of a side wall of the hollow cylinder in a direction substantially parallel to the side wall using a second punch so as to have a given thickness throughout the side wall; and (c) machining an outer surface of the side wall of the hollow cylinder so as to have a given surface roughness and a given roundness.

In the preferred mode of the invention, the manufacturing method further includes the step of stretching pressing a central portion of the bottom of the hollow cylinder member to form a cylindrical recess projecting inward of the hollow cylindrical member coaxially with the side wall of the hollow cylinder for mounting a support shaft of the rotary head drum.

The manufacturing method also includes the step of thrusting the end of the side wall of the hollow cylinder to form an annular protrusion on the corner of the bottom and the step of machining a groove traversing a portion of the annular protrusion for exposing a magnetic head outside of the side wall of the hollow cylinder when the magnetic head is mounted on the bottom of the hollow cylinder.

The manufacturing method further includes the step of pressing the bottom of the hollow cylinder to form protrusions on an outer surface of the bottom for mounting a magnetic head and a rotary transformer.

The machining step machines the outer surface of the side wall of the hollow cylinder using a cutting tool provided with a diamond tip which has a rake face defined by a plane in a crystal lattice of diamond of the tip having a Miller indices of 110 and which has a flank defined by a plane in the crystal lattice of the diamond having a Miller indices of 112.

The manufacturing method further includes the step of machining an inner surface of the cylindrical recess formed in the bottom of the hollow cylinder using a cutting tool whose tool angle is an obtuse angle greater than 45°.

The manufacturing method further includes the step of smoothing an inner surface of a bottom of the cylindrical recess formed in the bottom of the hollow cylinder to form a reference level for machining other portions of the hollow cylinder.

The manufacturing method further incudes the step of chamfering corners of portions of the hollow cylinder to be machined so as to have given heights from the reference level.

The single circular plate has a thickness of 2.5 mm or more.

According to a third aspect of the invention, there is provided a product by the processes as set forth above.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 1(a) is a cross sectional view which shows a die and a workpiece use to form a cylinder with a bottom in a drawing process according to the present invention;

FIG. 1(b) is a cross sectional view which shows a hollow cylinder formed by the drawing in FIG. 1(a);

FIG. 1(c) is a cross-sectional view of a portion of FIG. 1(b);

FIG. 2(a) is a cross sectional view which shows a hollow cylinder and a die used in a first step of thrusting press of the invention;

FIG. 2(b) is a cross sectional view which shows a hollow cylinder formed by the press in FIG. 2(a);

FIG. 2(c) is a cross-sectional view of a portion of FIG. 2(b);

FIGS. 16(a) and 16(b) are partially cross sectional views which show chamfered surfaces of the holes formed in the hollow cylinder shown in FIG. 11;

FIG. 17 is a partially side view which shows chamfered surfaces of an opening formed in a ring-shaped protrusion of the hollow cylinder of FIG. 11;

FIG 17(a) is an enlarged view of a portion of FIG. 17;

FIG. 18 is a cross sectional view which shows a modification of the press shown in FIGS. 2 and 3;

DESCRIPTION OF THE PREFERRED EMBODIMENT

Figure 3A:
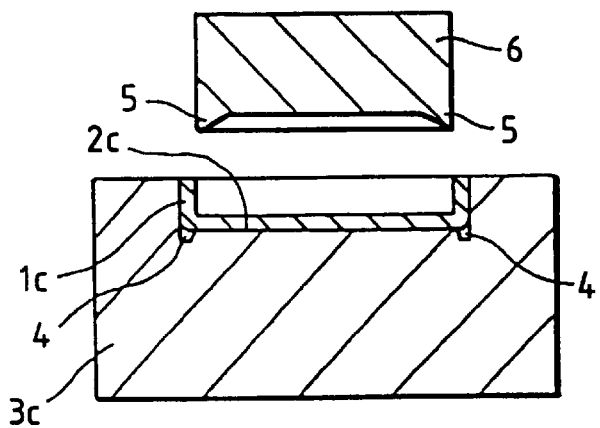
FIG. 3(a) is a cross sectional view which shows a hollow cylinder and a die used in a second step of thrusting press.

Referring now to the drawings, particularly to FIGS. 1(a) to 6, there are shown sequential press processes for forming an upper cylinder of a rotary head drum used in a VHS video tape recorder, for example.

First, a 85 mm-diameter, 3 mm-thick aluminum circular plate 1a is, as shown in FIG. 1(a), placed over a cylindrical recess 2a having a diameter of 65 mm formed in an upper surface of a press die 3a in coincidence of the center of the circular plate 1a with the center of the recess 2a. The circular plate 1a may alternatively be an aluminum alloy or steel plate having a thickness of 2.5 mm or more enough to withstand breakage during press or deformation of a pressed cylinder when clamped by a chuck for finishing. Next, the circular plate 1a is forced into the recess 2a using a 58 mm-diameter punch 10 to bend the peripheral portion of the circular plate 1a, as shown in FIG. 1(b), perpendicular to the center or bottom to form a bottomed hollow cylinder 1b. This process is generally called "drawing". The drawing may be performed two or more times in order to sharpen a corner A of the hollow cylinder 1b.

Figure 7A:
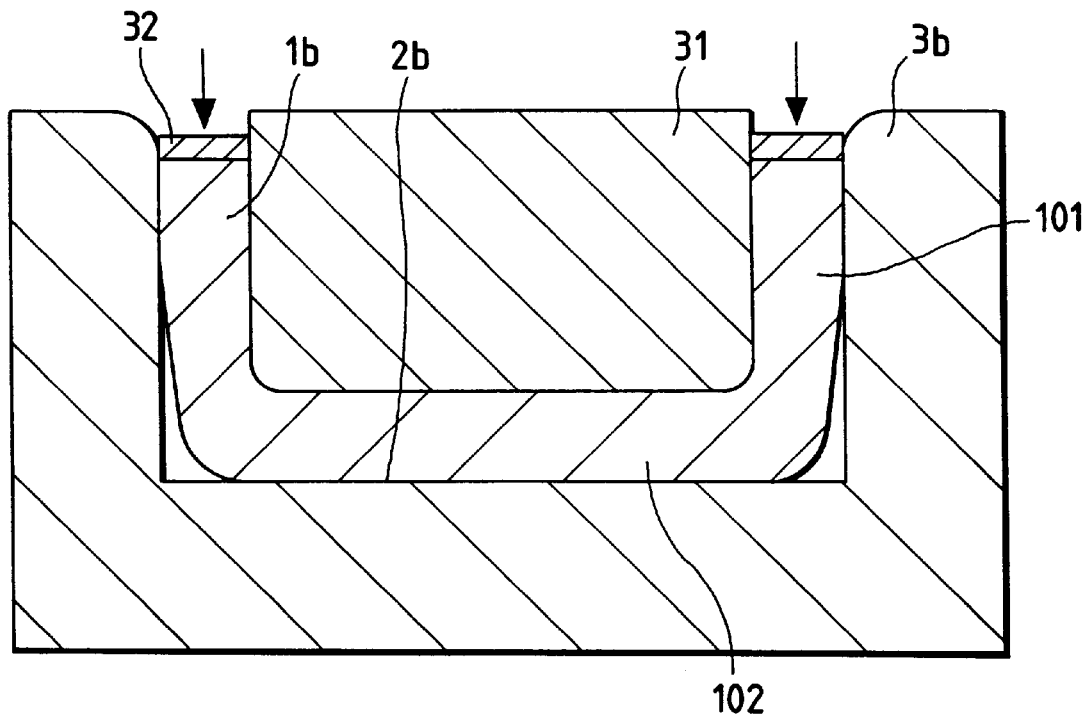
FIGS. 7(a) and 7(b) are enlarged cross sectional views which show a variation in wall thickness of the hollow cylinder by the thrusting press shown in FIG. 2(a)

After being pressed in FIG. 1, the hollow cylinder 1b will have, as shown in FIG. 7(a), a thin-walled portion ranging from the middle of the side wall 101 to the bottom 102. The wall thickness of the thin portion is nonuniform.

In order to deform the side wall of the hollow cylinder 1b to be uniform in thickness, the press, as will be referred to as thrusting press in the following discussion, is performed in the following manner.

First, the hollow cylinder 1b is, as shown in FIG. 2(a), fitted into a cylindrical recess 2b having a diameter of 65 mm formed in a press die 3b.

Figure 7B:
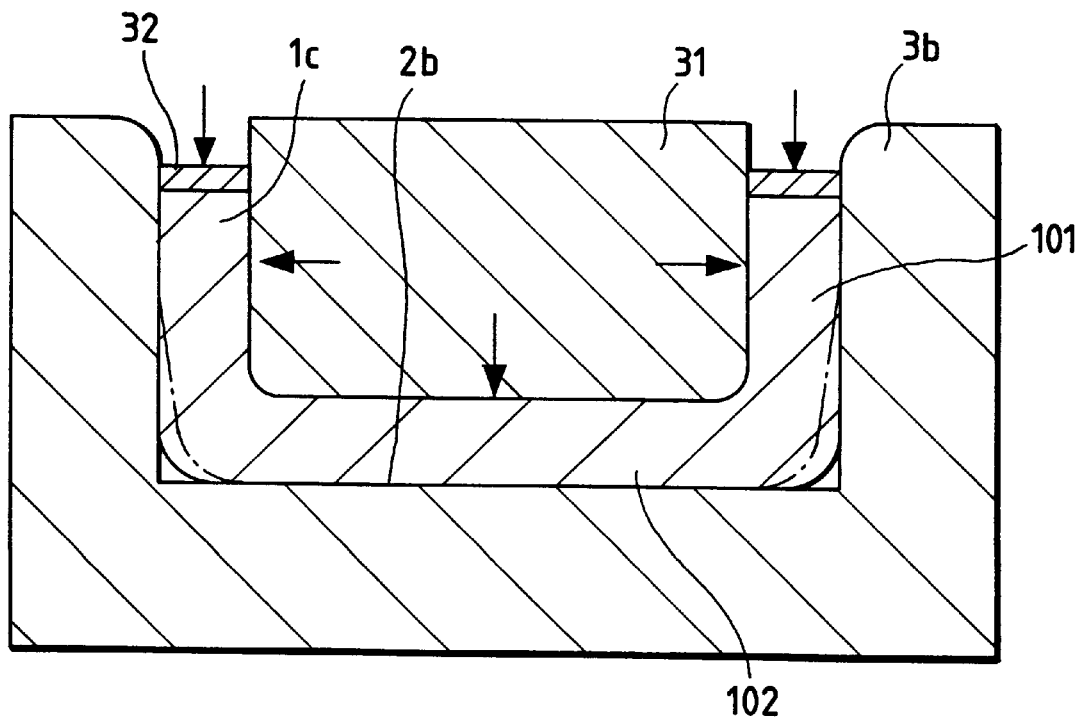

A cylinder punch 31, as shown in FIG. 7(a), having a diameter of 58 mm is fitted into the hollow cylinder 1b to hold it firmly. The end of the side wall of the hollow cylinder 1b is then thrust or struck using an annular punch 32 downward, as viewed in the drawing, to press the side wall 101 vertically against the bottom of the press die 3b, thereby thickening the thin-walled portion of the side wall 101 to form a hollow cylinder 1c, as shown in FIGS. 7(b) and 2(b) having uniform overall thickness of the side wall 101.

The uniformity of thickness of the side wall 101 provides uniformity of a machining allowance of the periphery of the side wall 101, thereby facilitating machining of the side wall 101 for establishing a desired circularity thereof. This avoids rotational shake of the hollow cylinder 1b when used as an upper cylinder of a rotary head drum. The thrusting press also sharpens the corner A of the hollow cylinder 1c as shown in FIG. 2(b).

Figure 8:
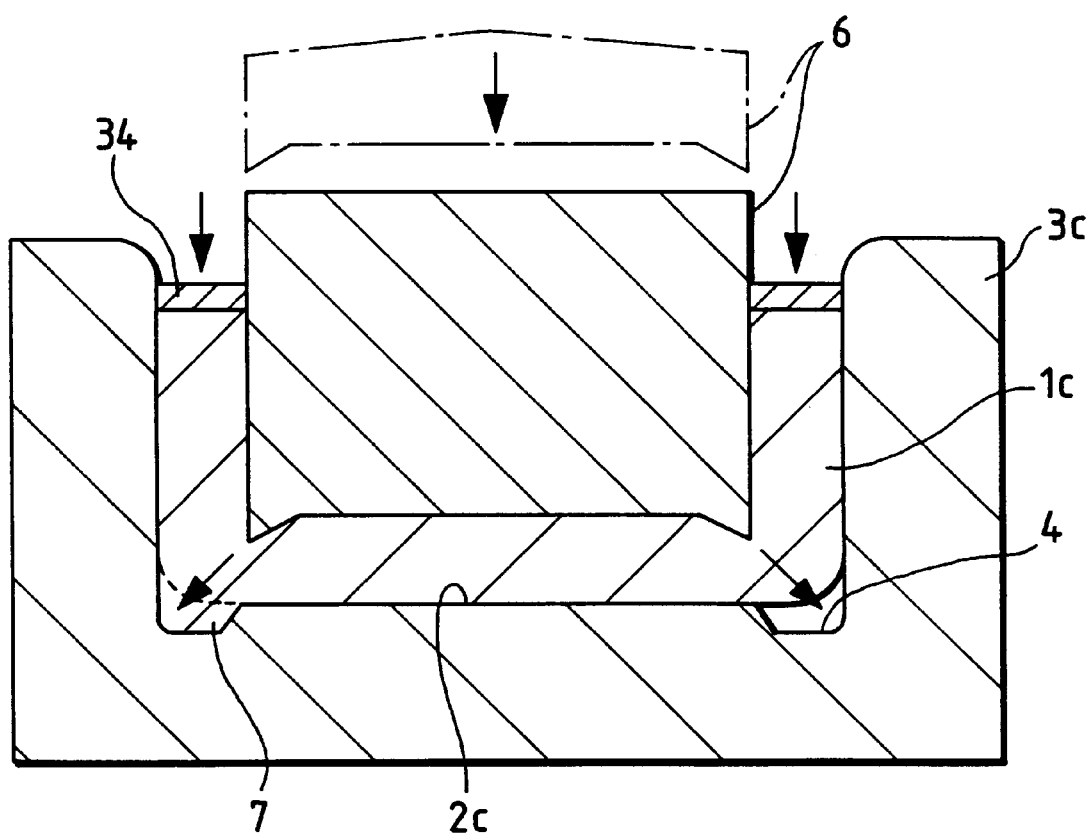
FIG. 8 is an enlarged cross sectional view which shows the thrusting press shown in FIG. 3(a)
Figure 9:
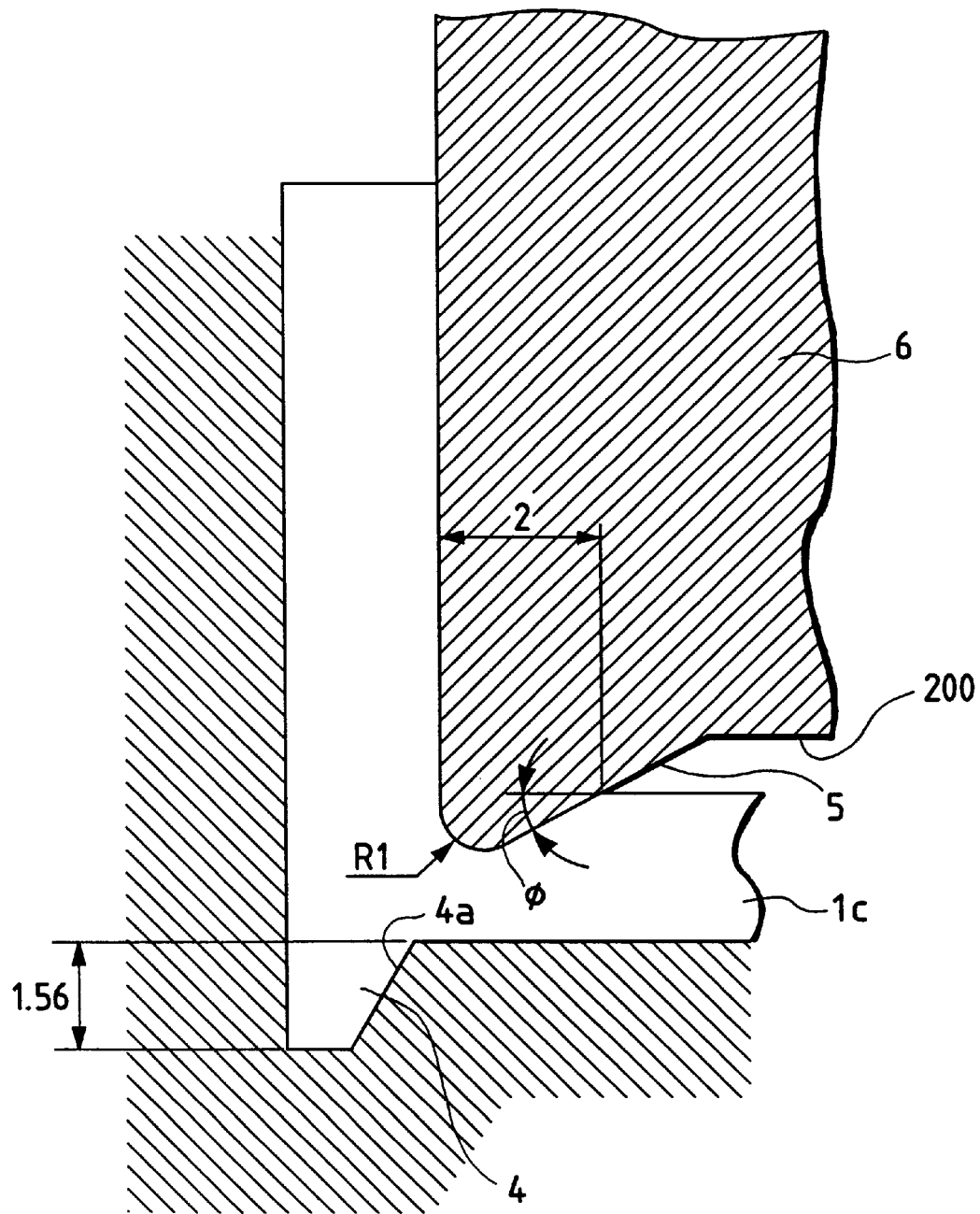
FIG. 9 is a partially enlarged cross sectional view which shows the thrusting press shown in FIG. 8.

The thus formed hollow cylinder 1c is, as shown in FIGS. 3(a), 8, and 9, fitted into a cylindrical recess 2c having a diameter of 65 mm, formed in a press die 3c. The cylindrical recess 2c has, as clearly shown in FIG. 9, formed in a peripheral portion of the bottom thereof an annular groove 4 having a depth of approximately 1.56 mm. The annular groove 4 has a side surface 4a tapered off to the bottom thereof so as to define a trapezoidal shape in cross section.

Figure 3B:
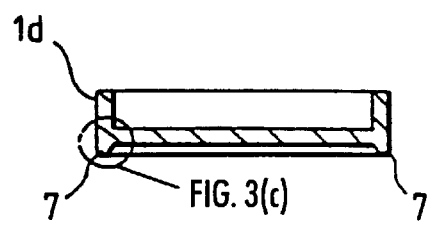
FIG. 3(b) is a cross sectional view which shows a hollow cylinder formed by the press in FIG. 3(a)
Figure 3C:
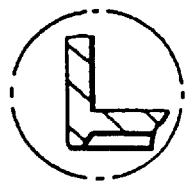
FIG. 3(c) is a cross-sectional view of a portion of FIG. 3(b)

Subsequently, the thrusting press is performed again in the following manner. A cylindrical punch 6 having a diameter of 56 mm is, as shown in FIG. 8, is inserted into the hollow cylinder 1c to hold it in the recess 2c of the press die 3c. The end of the side wall of the hollow cylinder 1c is then struck downward, as viewed in the drawing, using an annular punch 34 to force the corner or peripheral portion of the bottom of the hollow cylinder 1c into the annular groove 4 of the press die 3c to form a hollow cylinder 1d, as shown in FIG. 3(b), which has a ring-shaped protrusion 7 contoured to the annular groove 4. The ring-shaped protrusion 7 is provided to have a given gap between the bottom of the hollow cylinder 1d when used as an upper cylinder of a rotary head drum and a lower cylinder of the rotary head drum.

FIG. 8 shows at the lower right corner the annular groove 4 immediately before the corner of the hollow cylinder 1c is deformed by the impact of the punch 34 and at the lower left corner the corner of the hollow cylinder 1c (i.e., the ring-shaped protrusion 7) after being deformed along the annular groove 4. The punch 34 has formed in its bottom a recess 200, as shown in FIG. 9, defined by a tapered surface 5 which has an inclination of φ (25° to 35°, preferably, 30°) relative to the bottom of the hollow cylinder 1c. An end of the tapered surface 5 is rounded by R=1 mm. The ring-shaped protrusion 7 is formed with plastic deformation of the peripheral portion of the bottom of the hollow cylinder 1c by the tapered surface 5 on the bottom of the punch 34.

Figure 4A:
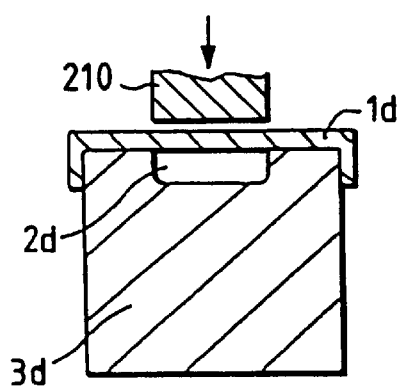
FIG. 4(a) is a cross sectional view which shows a hollow cylinder and a die used in a first step of stretching press following the press shown in FIG. 3(a) for forming a cylindrical recess in a bottom of the hollow cylinder.
Figure 4B:
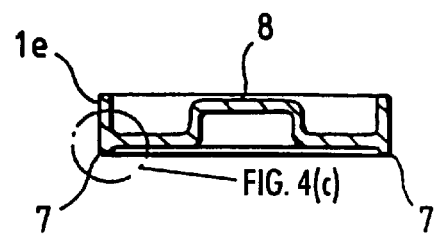
FIG. 4(b) is a cross sectional view which shows a hollow cylinder formed by the press in FIG. 4(a)
Figure 4C:
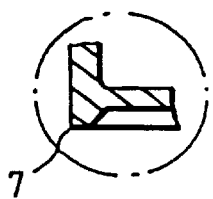
FIG. 4(c) is a cross-sectional view of a portion of FIG. 4(b)

The thus formed hollow cylinder 1d is, as shown in FIG. 4(a), placed on a cylindrical press die 3d which has formed in its central portion of an upper surface a cylindrical recess 2d having a diameter of 25 mm and a depth of 10 mm. The hollow cylinder 1d is then forced by a punch 210 having a diameter of 20 mm into the recess 2d in stretching press to form a hollow cylinder 1e, as shown in FIG. 4(b), having formed in a central portion of the bottom thereof a cylindrical recess (i.e., a hub) 8 contoured to the recess 2d of the press die 3d. An inner diameter of the cylindrical recess 8 will be approximately 20.5 mm to 21.5 mm.

Figure 5A:
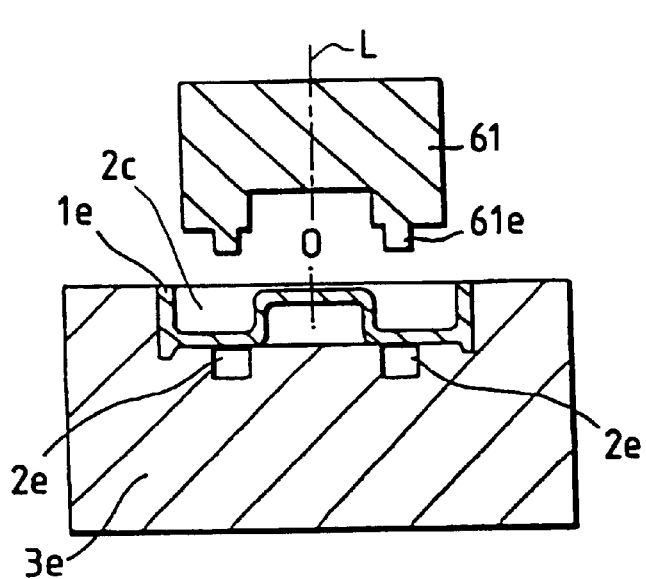
FIG. 5(a) is a cross sectional view which shows a hollow cylinder and a die used in a second step of stretching press for forming curved protrusions on a bottom of the hollow cylinder.
Figure 5B:
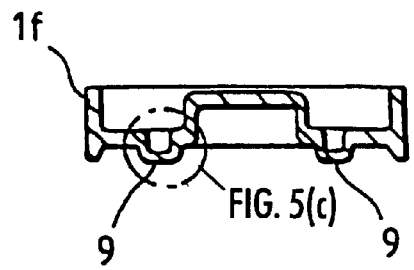
FIG. 5(b) is a cross sectional view which shows a hollow cylinder formed by the press in FIG. 5(a)
Figure 10:
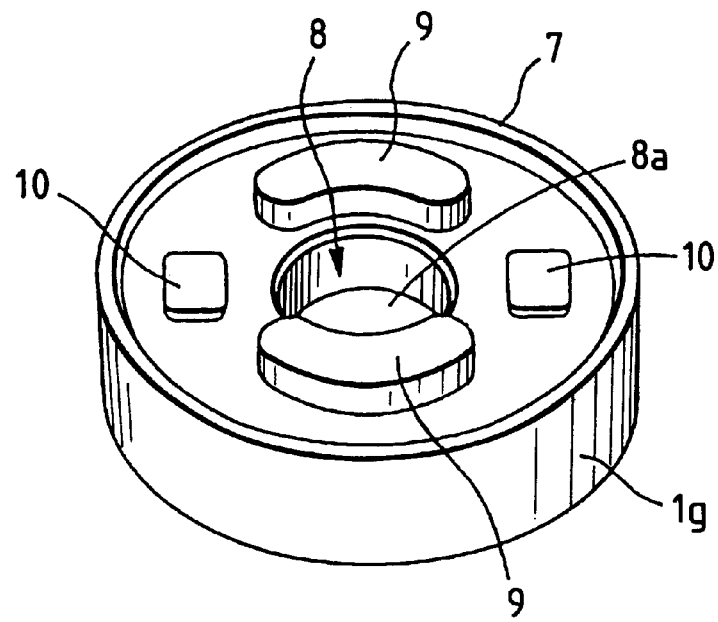
FIG. 10 is a perspective view which shows the hollow cylinder formed by the press in FIG. 6(a)

Subsequently, the hollow cylinder 1e is, as shown in FIG. 5(a), fitted into the cylindrical recess 2c formed in a press die 3e which is identical with the one shown in FIG. 3(a). The press die 3e has formed in the cylindrical recess 2c a pair of curved grooves 2e each having a width of 10 mm and a length of 25 mm. The curved grooves 2e are formed with a quarter of a circle and diametrically opposed to each other with respect to the center O of the cylindrical recess 2c. The bottom of the hollow cylinder 1e is then forced into the curved grooves 2e using a punch 61 to form a hollow cylinder 1f, as shown in FIGS. 5(b) and 10, having formed on its bottom curved protrusions 9 contoured to the curved grooves 2e, serving as mounting basses for rotary transformers. The curved protrusions 9 are arranged around the cylindrical recess 8. In other words, the cylindrical recess 8 is formed in the vicinity of the curved protrusions 9. This is because it is desirable that the inner diameter of the cylindrical recess 8 be as large as possible for establishing stability of relative motion of the cylindrical recess 8 and the drum shaft fitted into the cylindrical recess 8 to minimize rotational shake of the rotary head rum.

The punch 61 has, as shown in FIG. 5(a), formed on its bottom a pair of curved protrusions 61e each of which is defined by a quarter of a circle having a width of 10 mm and a length of 25 mm and which are diametrically opposed to each other across the center line L thereof. The punch 61 deforms or stretches at the curved protrusions 61e the bottom of the hollow cylinder 1e into the curved grooves 2e to form the curved protrusions 9.

Figure 6A:
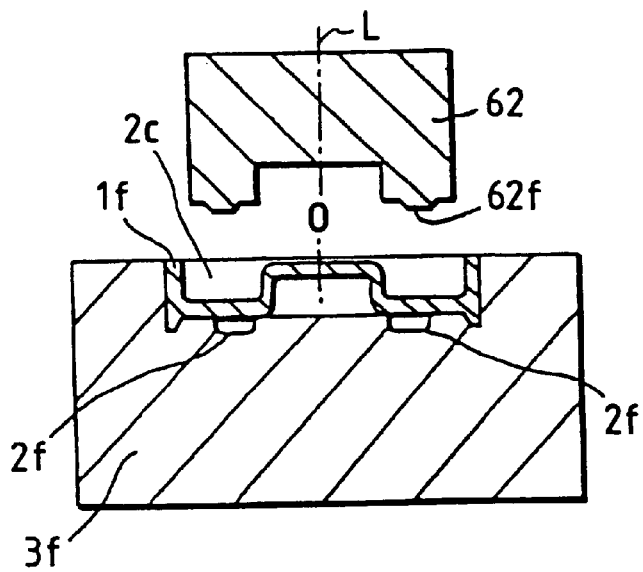
FIG. 6(a) is a cross sectional view which shows a hollow cylinder and a die used in a third step of stretching press for forming rectangular protrusions on a bottom of the hollow cylinder.
Figure 6B:
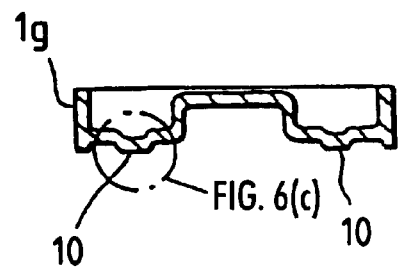
FIG. 6(b) is a cross sectional view which shows a hollow cylinder formed by the press in FIG. 6(a)

Subsequently, the hollow cylinder 1f is, as shown in FIG. 6(a), fitted into the cylindrical recess 2c formed in a press die 3f. FIG. 6(a) shows a cross section of the hollow cylinder 1f as viewed from a direction perpendicular to the one shown in FIG. 5(a). The press die 3f has formed in the cylindrical recess 2c a pair of rectangular recesses 2f each having a width of 8 mm and a length of 10 mm, diametrically opposed to each other with respect to the center O of the cylindrical recess 2c. The bottom of the hollow cylinder 1f is then forced into the rectangular recesses 2f using a punch 62 to form a hollow cylinder 1g, as shown in FIGS. 6(b) and 10, having formed on its bottom rectangular protrusions 10 contoured to the rectangular recesses 2f. The punch 62 has, as shown in FIG. 6(a), formed on its bottom a pair of rectangular protrusions 62f which are diametrically opposed to each other across the center line L and each of which has a width of 8 mm and a length of 10 mm. The punch 62 deforms or stretches at the rectangular protrusions 62f the bottom of the hollow cylinder if into the rectangular recesses 2f to form the rectangular protrusions 10. Each of the rectangular protrusions 10 serves as a mounting base for a magnetic head.

Figure 11:
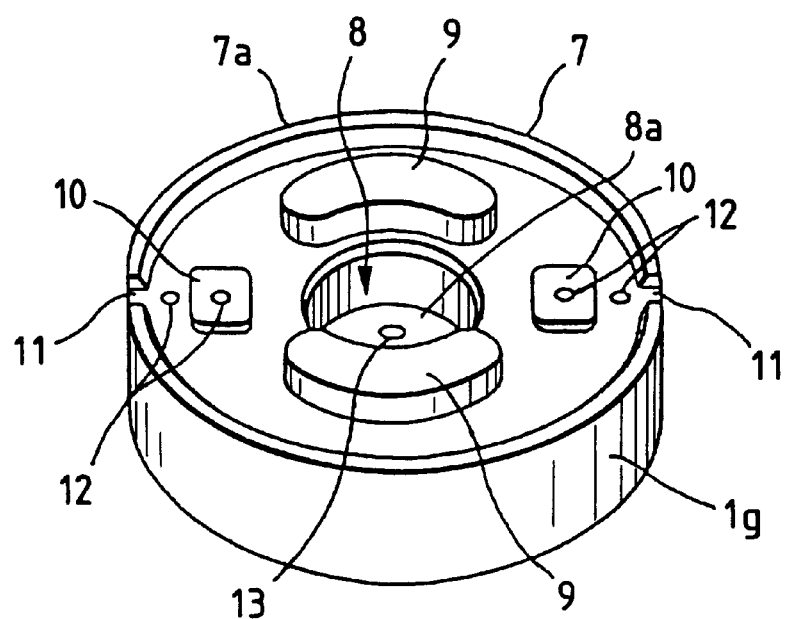
FIG. 11 is a perspective view which shows the hollow cylinder in FIG. 10 drilled to form a plurality of holes.

Threaded holes 12 for mounting the rotary transformers and the magnetic heads and a center hole 13 for supporting a drum shaft, as shown in FIG. 11, are formed at preselected locations of the hollow cylinder 1g. The hollow cylinder 1g is then subjected to heat treatment and finish machined into a desired shape. The threaded holes 12 are commonly formed by spotting holes in press working and tapping the holes, however, they may alternatively be formed in another manner.

Prior to the machining of the hollow cylinder 1g, edges of portions to be machined, for example, the threaded holes 12 and an upper edge of each of grooves or openings 11 of the ring-shaped protrusion 7 may be chamfered, as shown in FIGS. 16(a), 16(b), and 17, for avoiding formation of burrs due to the machining. The openings 11 are formed, as clearly shown in FIG. 11, so as to traverse the ring-shaped protrusion 7 for partially exposing the magnetic heads outward when mounted on the rectangular protrusions 10 of the hollow cylinder 1g. It is desirable that the chamfered surface 12a be at an angle from 45°, as shown in FIG. 16(a), to 37.5°, as shown in FIG. 16(b), to the center line Q of the threaded hole 12. It is also desirable that the chamfered surface 7b have a length of 0.2 mm to 0.3 mm and be inclined at approximately 45° to an upper surface 7a of the ring-shaped protrusion 7.

Corners of upper surfaces of the curved protrusions 9 and the rectangular protrusions 10 may also be chamfered when they are machined.

Figure 12:
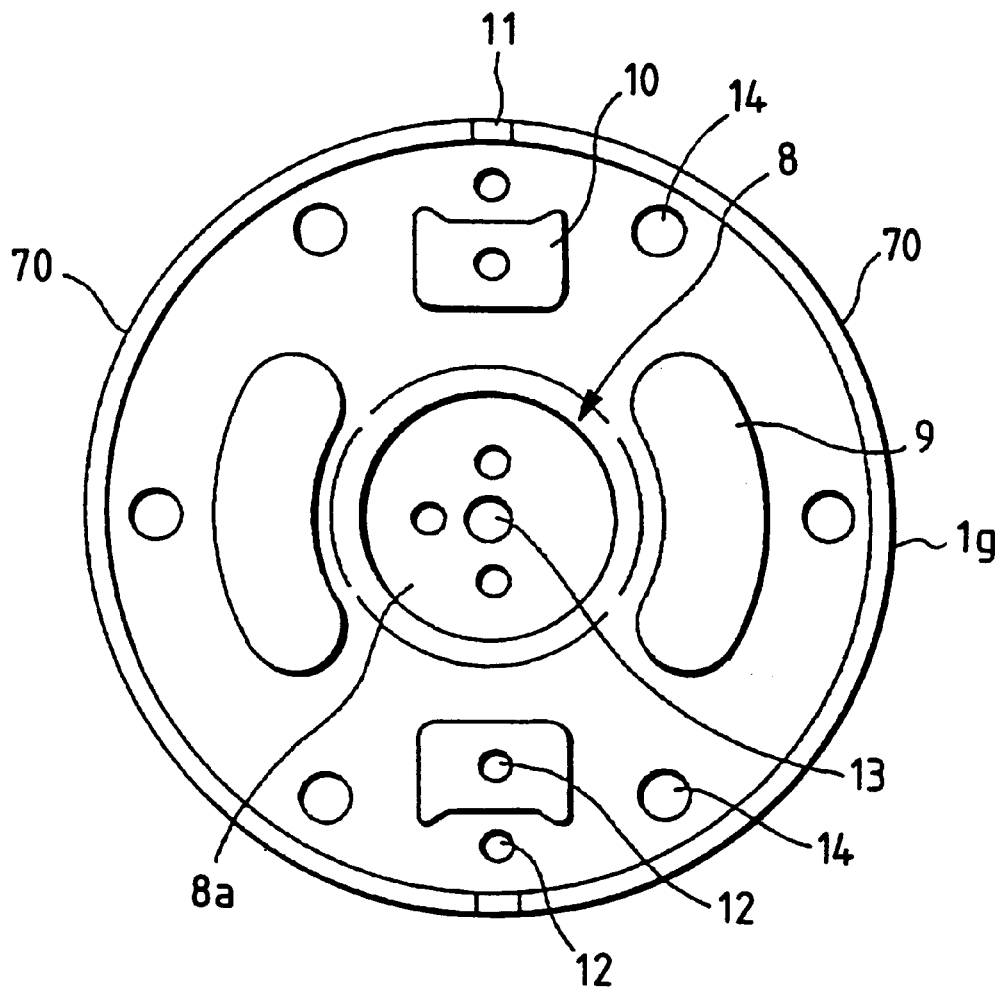
FIG. 12 is a plan view which shows the hollow cylinder in FIG. 11 on which dowels are formed.
Figure 14:
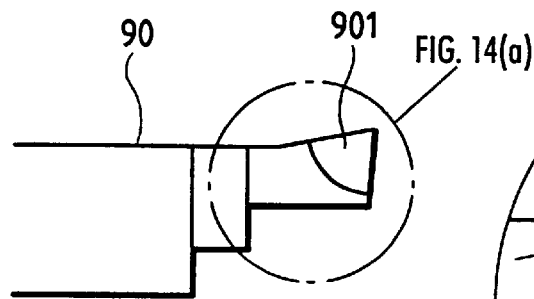
FIG. 14 is a partial side view which shows a cutting tool used in a finishing process.
Figure 14A:
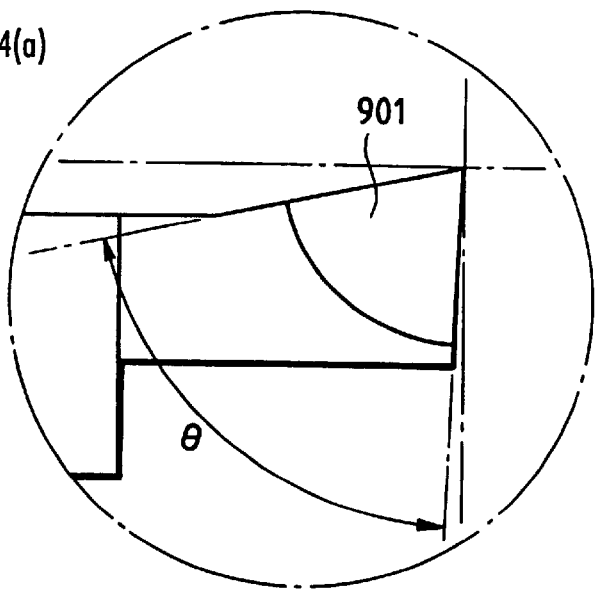
FIG. 14(a) is an enlarged view of a portion of FIG. 14.
Figure 15:
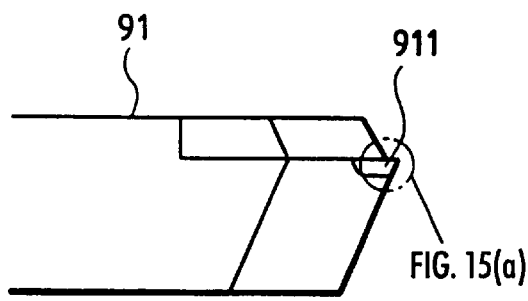
FIG. 15 is a partial side view which shows another cutting tool used in a finishing process.
Figure 15A:
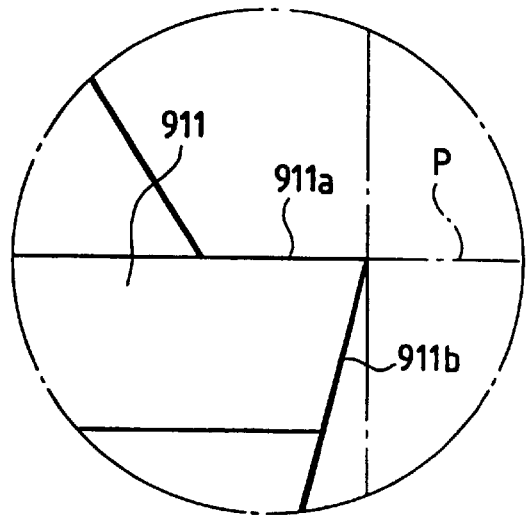
FIG. 15(a) is an enlarged view of a portion of FIG. 15.

The machining of the hollow cylinder 1g involves rounding a side wall of the hollow cylinder 1g so as to have a desired surface roughness, smoothing an inner surface 8a of the bottom wall of the cylindrical recess 8, as shown in FIGS. 11 and 12, to define a reference level perpendicular to the central axis of the hollow cylinder 1g, machining and smoothing upper surfaces of the curved protrusions 9 and the rectangular protrusions 10 to given heights from the reference level, i.e., inner surface 8a (e.g., machining the upper surfaces of the rectangular protrusions 10 if used as the magnetic head mounting base up to a height of 8 mm to 10 mm and the upper surfaces of the curved protrusions 9 if used as the rotary transformer mounting base up to a height of 11 mm to 13 mm), and forming the openings 11 in alignment with the rectangular protrusions 10 as clearly shown in FIGS. 11 and 12. The above machining of the hollow cylinder 1g may be performed using a cutting tool 90 or 91 as shown in FIGS. 14 and 15 with the outer side wall of the cylindrical recess 8 clamped and rotated by a three-jaw chuck or a four-jaw chuck. The openings 11 may alternatively be formed simultaneously with the press to form the ring-shaped protrusion 7.

After the hollow cylinder 1g is finish machined, the magnetic heads and the rotary transformers are mounted on the rectangular protrusions 10 and the curved protrusions 9, respectively. The hollow cylinder 1g is then mounted on the drum shaft in engagement of the reference level, i.e., inner surface 8a of the cylindrical recess 8 with the top of the drum shaft having a disc or flange.

Figure 13A:
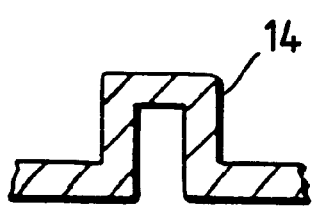
FIGS. 13(a) and 13(b) are partially cross sectional views which show the dowels formed in the hollow cylinder of FIG. 12.
Figure 13B:
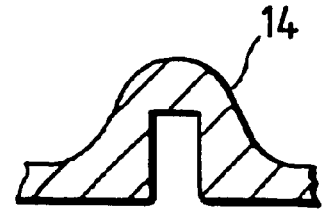

Two or more dowels, as shown in FIG. 12, may be formed on the upper surface of the hollow cylinder 1g around the center hole 13 as a guide plane for jigs for machining the rectangular protrusions 10. The dowels may be formed, as shown in FIGS. 13(a) and 13(b), by half blanking or drawing.

First Modification

Instead of the two thrusting press processes as shown in FIGS. 2(a) and 3(a), a single thrusting press, as discussed below, may be performed to adjust the thickness of the side wall and bottom of the hollow cylinder 1b and to form the ring-shaped protrusion 7 simultaneously.

First, the hollow cylinder 1b formed by the drawing in FIG. 1 is fitted into the cylindrical recess 2c of the press die 3c as shown in FIG. 18. Next, the hollow cylinder 1b is firmly held by a punch 33 made of a cylindrical member which has the same diameter of that of the punch 6 and which is rounded at a peripheral corner thereof. The end of the side wall of the hollow cylinder 1b held by the punch 33 is then thrusted using an annular punch 34 downward, as viewed in the drawing, to press the side wall 101 vertically against the bottom 102 of the press die 3c, thereby making the thickness of the side wall 101 and the bottom 102 uniform and to force the corner or peripheral portion of the bottom 102 into the annular groove 4 of the press die 3c to form the ring-shaped protrusion 7 contoured to the annular groove 4. This forms the same cylinder as the hollow cylinder 1d as shown in FIGS. 3(a) and 3(b).

Second Modification

Figure 5C:
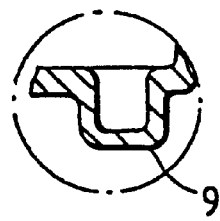
FIG. 5(c) is a cross-sectional view of a portion of FIG. 5(b)
Figure 19A:
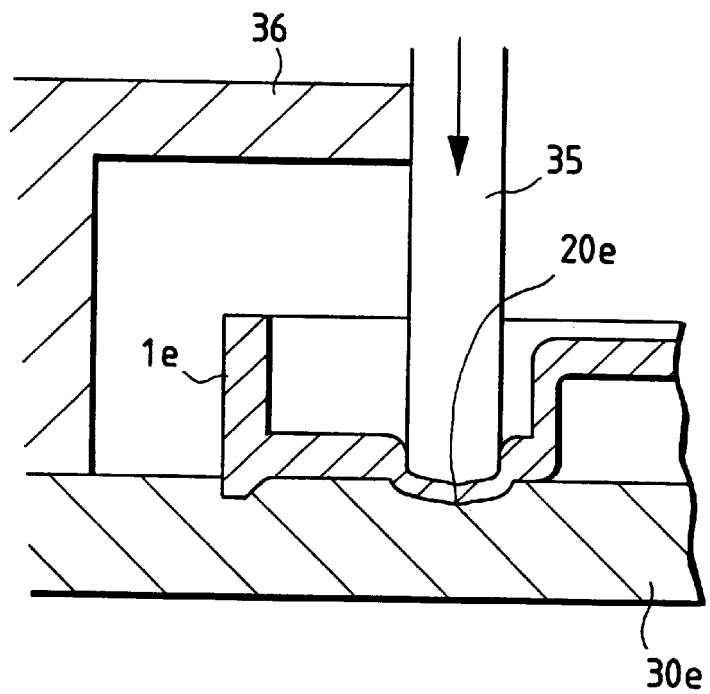
FIGS. 19(a) and 19(b) are partially cross sectional views which shows a sequence of backward extrusion processes which may alternatively performed instead of the press shown in FIG. 5(a)
Figure 19B:
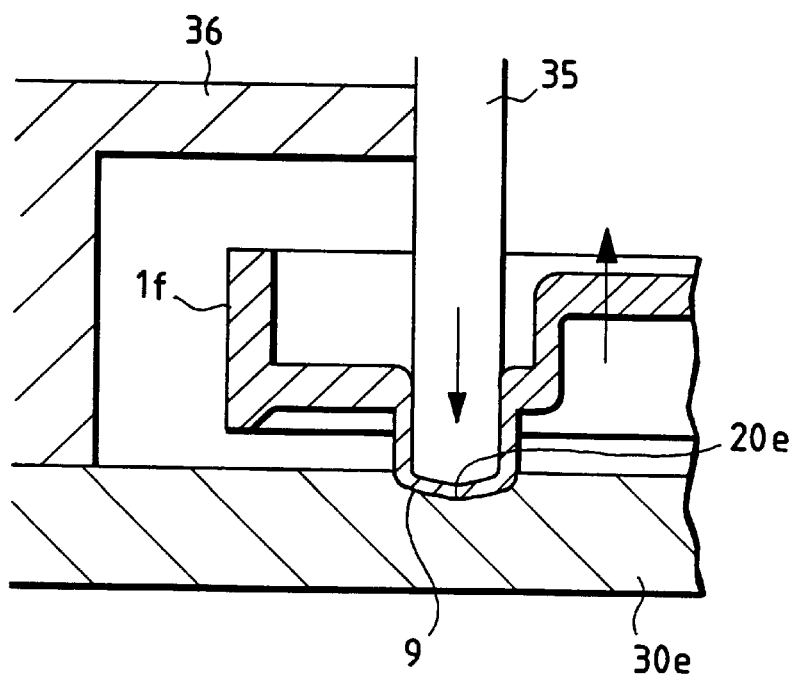

Instead of the manufacturing process, as discussed in FIG. 5, to form the hollow cylinder 1f or the stretching process to form the ring-shaped protrusion 9 in the above first modification, the backward extrusion may be used. For example, the hollow cylinder 1e is, as shown in FIG. 19(a), disposed on a press die 30e having formed therein a pair of curved grooves 20e each having a width of 10 mm and a length of 25 mm. The curved grooves 20e are formed with a quarter of a circle and diametrically opposed to each other with respect to the center of the press die 30e. The bottom of the hollow cylinder 1e is then forced into the curved grooves 20e using a punch 35 to form the hollow cylinder 1f, as shown in FIG. 9(b), having formed on its bottom curved protrusions 9 defined by an inner wall contoured to an outer wall of the punch 35 and an outer wall contoured to an inner wall of the curved grooves 20e. The curved grooves 20e are smaller in depth than the curved grooves 2e shown in FIG. 5(a) and have, for example, a depth of 2 mm to 2.5 mm. The punch 35 has an end similar in shape to the curved protrusions 61e of the punch 61 as shown in FIG. 5(a). The press die 30e includes a stripper plate 36 which strips the hollow cylinder 1f free of the punch 35 when the punch 35 is lifted up after the backward extrusion. The backward extrusion eliminates the need for holding the hollow cylinder 1e against the press die 30e through the punch 35, thus preventing portions of the hollow cylinder 13 to be extruded (i.e., the curved protrusions 9) from rupturing.

Third Modification

Figure 6C:
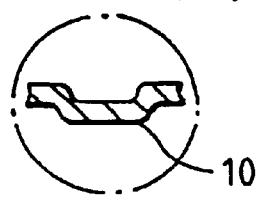
FIG. 6(c) is a cross-sectional view of a portion of FIG. 6(b)
Figure 20:
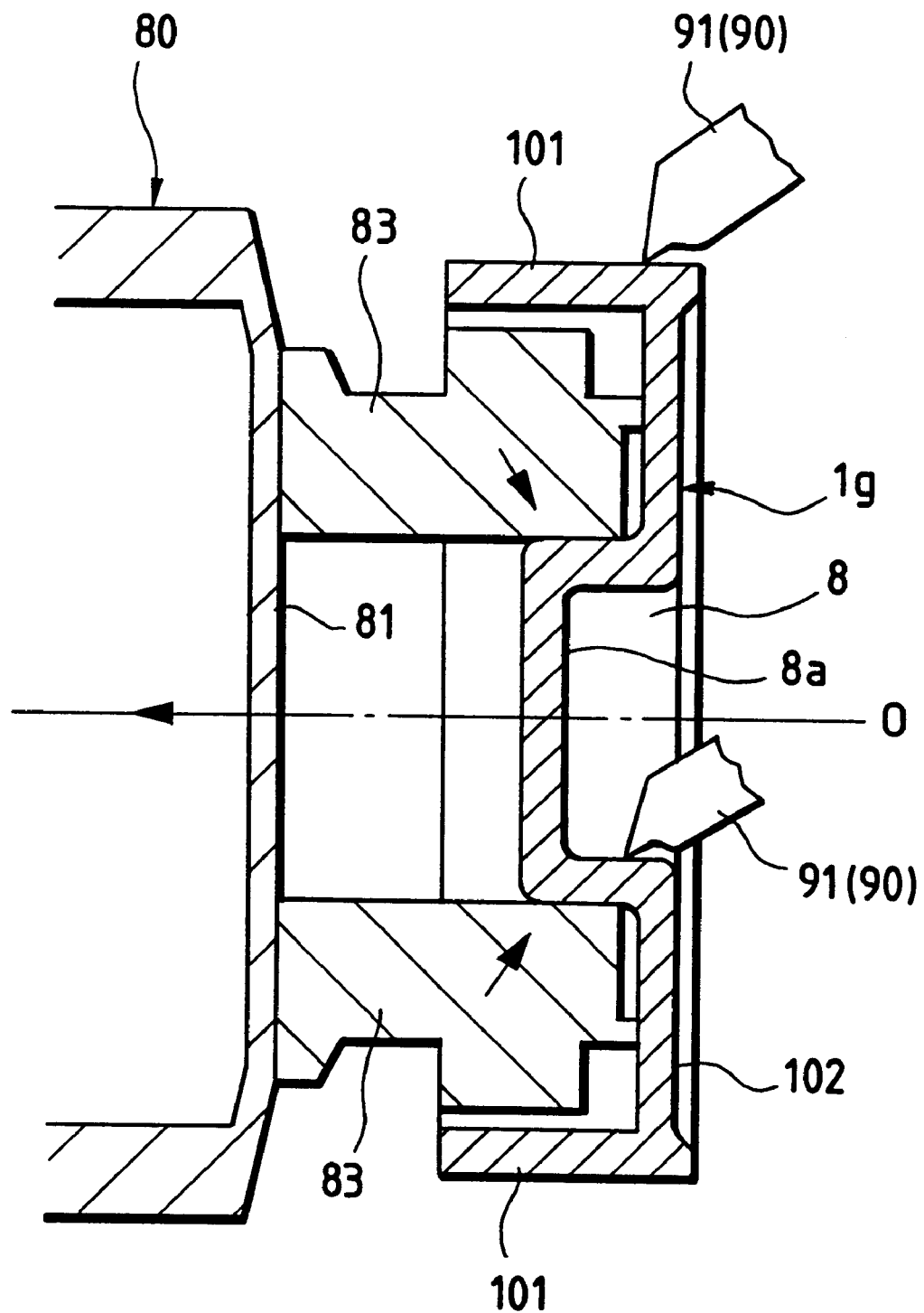
FIG. 20 is a partially cross sectional view which shows a chuck and a hollow cylinder when an outer surface of the hollow cylinder is finish machined using a cutting tool.

Instead of the process to machine the hollow cylinder 1g after the press, as discussed in FIG. 6, or in the first or second modification, the hollow cylinder 1g may be machined with the cylindrical recess 8 held and rotated by a diaphragm type chuck 80 as shown in FIG. 20. The diaphragm type chuck 80 includes a diaphragm 81 provided at an end of a hollow cylinder and three or more, e.g., eight jaws 83 disposed on the diaphragm 81 around the center of thereof at regular intervals. The movement of the diaphragm 81 in a direction as indicated by an arrow by air pressure causes the jaws 83 to be shifted inward to clamp the periphery of the cylindrical recess 8 of the hollow cylinder 1g securely. The hollow cylinder 1g clamped by the chuck 80 is then rotated. The outer side wall 101 and the outer bottom wall 102 of the hollow cylinder 1g and the inner side and bottom walls of the cylindrical recess 8 are machined by the cutting tool 90, as shown in FIG. 14, or the cutting tool 91, as shown in FIG. 15. It is advisable that the inner side and bottom walls of the cylindrical recess 8 be machined from an opening end toward the bottom thereof. Since the thickness of the corner between the bottom and the side wall of the cylindrical recess 8 is greater than that of other portions, a large amount of material must be removed, which may cause, for example, a tip 901 of the cutting tool 90 to be broken. In order to increase a service life of the cutting tool 90, it is desirable that the tool angle θ of the tip 901 be an obtuse angle greater than 45°, preferably, 60° to 75°. It is also desirable that the cutting tool 91, as shown in FIG. 15, having a natural or synthetic diamond-made tip 911 be used. The tip 911 has a rake face 911a defined by a plane in a crystal lattice of diamond of the tip having a Miller indices of (110) and has a flank 911b defined by a plane in the crystal lattice of the diamond having a Miller indices of (112). The (112) plane has a higher hardness. The increase in service life of the cutting tool 91 is thus achieved by using the (112) plane as the flank 911b. In FIG. 15, P indicates a plane perpendicular to a surface to be finished.

Fourth Modification

Figure 21:
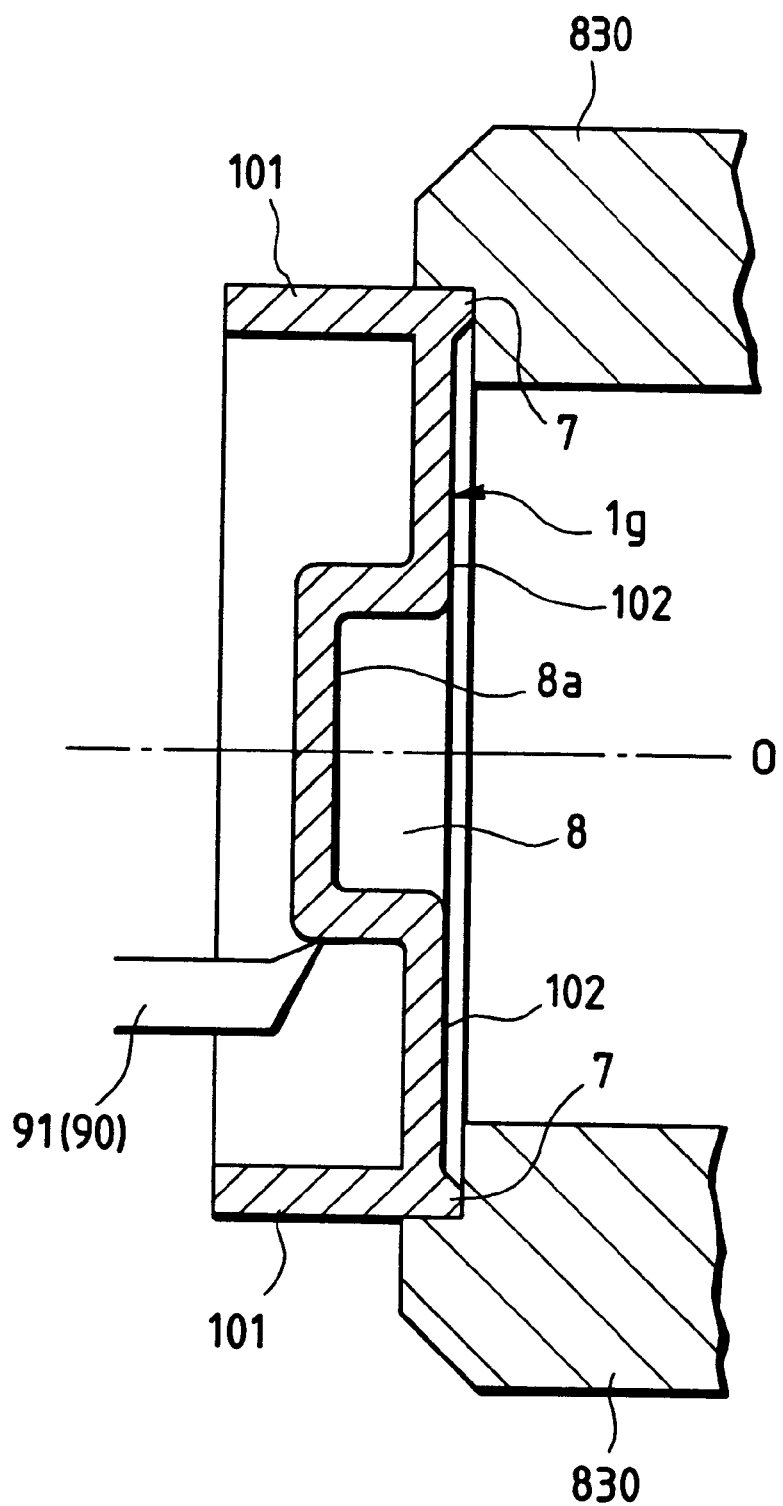
FIG. 21 is a partially cross sectional view which shows a chuck and a hollow cylinder when an inner surface of the hollow cylinder is finish machined using a cutting tool.

Instead of the process to machine the hollow cylinder 1g after the press, as discussed in FIG. 6, or in the first, second, or third modification, the outer wall of the bottom of the cylindrical recess 8 may be machined prior to machining the side wall 101 of the hollow cylinder 1g and the inner wall of the cylindrical recess 8. First, the side wall 101 of the hollow cylinder 1g is, as shown in FIG. 21, clamped with a weak force using three or more, e.g., eight jaws 830 of a diaphragm type chuck (not shown) similar to the one shown in FIG. 20. The inner peripheral surface of the side wall 101, the inner surface of the bottom 102, and the side surface and the bottom surface of the cylindrical recess 8 are machined using the cutting tool 91 or 90 or other similar tool such as a carbide bit, a monocrystal or polycrystal natural or synthetic diamond bit, a coated bit, or a cermet bit.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The above embodiments refer to the press processes for forming an upper cylinder for use in a rotary head drum, however, the present invention may be used to form a cylinder for a rotary drum of a digital audio tape recorder, a DVC cylinder, or a motor hub.

What is claimed is:

1. A method of manufacturing a hollow cylinder with a bottom comprising the steps of:

pressing a single circular plate using a first punch to form a hollow cylinder with a bottom;

thrusting an end of a side wall of the hollow cylinder in a direction substantially parallel to the side wall using a second punch so as to have given shape and given thickness of the side wall;

pressing the bottom of the hollow cylinder to form an annular protrusion on a peripheral portion of the bottom;

stretching pressing a central portion of the bottom of the hollow cylinder member to form a recess protecting inward of the hollow cylindrical member coaxially with the side wall of the hollow cylinder;

machining a groove traversing a portion of the annular protrusion; and machining an outer surface of the side wall of the hollow cylinder so as to have a given surface roughness and a given roundness.

2. A hollow cylinder produced using the method of claim 1.

3. A method of manufacturing a bottomed hollow cylinder used as a rotary head drum comprising the steps of:

pressing a single circular plate using a first punch to form a hollow cylinder with a bottom;

thrusting an end of a side wall of the hollow cylinder in a direction substantially parallel to the side wall using a second punch so as to have a given thickness throughout the side wall;

thrusting the end of the side wall of the hollow cylinder to form an annular protrusion on a peripheral portion of the bottom;

stretching pressing a central portion of the bottom of the hollow cylinder member to form a cylindrical recess projecting inward of the hollow cylindrical member coaxially with the side wall of the hollow cylinder for mounting a support shaft of the rotary head drum;

machining a groove traversing a portion of the annular protrusion for exposing a magnetic head outside of the side wall of the hollow cylinder when the magnetic head is mounted on the bottom of the hollow cylinder; and machining an outer surface of the side wall of the hollow cylinder so as to have a given surface roughness and a given roundness.

4. A method as set forth in claim 3, wherein the machining step machines the outer surface of the side wall of the hollow cylinder using a cutting tool provided with a diamond tip which has a rake face defined by a plane in a crystal lattice of diamond of the tip having a Miller indices of 110 and which has a flank defined by a plane in the crystal lattice of the diamond having a Miller indices of 112.

5. A method as set forth in claim 3, further comprising the step of machining an inner surface of the cylindrical recess formed in the bottom of the hollow cylinder using a cutting tool whose tool angle is an obtuse angle greater than 45°.

6. A method as set forth in claim 3, further comprising the step of smoothing an inner surface of a bottom of the cylindrical recess formed in the bottom of the hollow cylinder to form a reference level for machining other portions of the hollow cylinder.

7. A method as set forth in claim 3, further comprising the step of chamfering corners of portions of the hollow cylinder to be machined so as to have given heights from the reference level.

8. A method as set forth in claim 3, wherein said single circular plate has a thickness of 2.5 mm or more.

9. A bottomed hollow cylinder produced using the method of claim 3.

10. A method of manufacturing a bottomed hollow cylinder used as a rotary head drum comprising the steps of:

thrusting an end of a side wall of the hollow cylinder in a direction substantially parallel to the side wall using a second punch so as to have a given thickness throughout the side wall;

stretching pressing a central portion of the bottom of the hollow cylinder member to form a cylindrical recess protecting inward of the hollow cylindrical member coaxially with the side wall of the hollow cylinder for mounting a support shaft of the rotary head drum pressing the bottom of the hollow cylinder to form protrusions on an outer surface of the bottom for mounting a magnetic head and a rotary transformer; and machining an outer surface of the side wall of the hollow cylinder so as to have a given surface roughness and a given roundness.

11. A method as set forth in claim 10, wherein the machining step machines the outer surface of the side wall of the hollow cylinder using a cutting tool provided with a diamond tip which has a rake face defined by a plane in a diamond crystal lattice, a tip having Miller indices 110, and a flank defined by a plane in the diamond crystal lattice having a Miller indices 112.

12. A method as set forth in claim 10, further comprising the step of smoothing an inner surface of a bottom of the cylindrical recess formed in the bottom of the hollow cylinder to form a reference level for machining other portions of the hollow cylinder.

13. A bottomed hollow cylinder produced using the method of claim 10.

* * * * *